US009357277B1

(12) United States Patent
Nijim et al.

(10) Patent No.: US 9,357,277 B1
(45) Date of Patent: May 31, 2016

(54) DYNAMIC URL PERSONALIZATION SYSTEM FOR ENHANCING INTERACTIVE TELEVISION

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/489,397

(22) Filed: Sep. 17, 2014

(51) Int. Cl.
*H04N 7/173* (2011.01)
*H04N 21/858* (2011.01)
*H04L 29/08* (2006.01)
*H04N 21/2668* (2011.01)

(52) U.S. Cl.
CPC ............ *H04N 21/8586* (2013.01); *H04L 67/10* (2013.01); *H04N 21/2668* (2013.01)

(58) Field of Classification Search
CPC .......... H04N 21/258; H04N 21/25825; H04N 21/25833; H04N 21/25841; H04N 21/25866; H04N 21/25883; H04N 21/25891; H04N 21/45; H04N 21/4516; H04N 21/4524; H04N 21/4532; H04N 21/458; H04N 21/466; H04N 21/4722; H04N 21/4725
See application file for complete search history.

(56) References Cited

U.S. PATENT DOCUMENTS

2008/0148336 A1* 6/2008 Walter et al. .................. 725/137
2011/0321083 A1* 12/2011 Rouse .............. H04N 21/44008
725/32

* cited by examiner

*Primary Examiner* — John Schnurr
(74) *Attorney, Agent, or Firm* — Merchant & Gould P.C.

(57) ABSTRACT

A URL personalization system allowing a television service provider to dynamically associate multiple URLs with the video content item being viewed by the customer is provided. The associated URLs point to additional content that may be of interest to different customer demographics. A generic URL linking to the associated URLs may be inserted into the video content item. The system may personalize the generic URL by replacing or modifying the generic URL with a personalized URL based on information specific to the customer viewing the content before streaming the content or when additional content is requested. The customer is redirected to the personalized URL to obtain the additional content. This allows the television service provider to send a single video content item to all customers or large groups of customers while providing individual customers with an enhanced interactive television viewing experience.

8 Claims, 5 Drawing Sheets

DYNAMIC URL PERSONALIZATION SYSTEM FOR ENHANCING INTERACTIVE TELEVISION

BACKGROUND

A growing number of customers choose to view video content streamed to various consumer electronic devices, such as tablets and smartphones, because they like more control over when, where, and how video content is experienced. Technology has also facilitated the use of multiple screens or windows (i.e., "multi-screening") to simultaneously consume different content. Consistent with these trends, video customers have also embraced interactive television, which offers a more immersive and enjoyable experience. Interactive television adds data services to traditional television technology. For example, interactive television may allow customers to obtain additional information related to the video content being watched. Conventional usage of interactive television provides the same message to all customers. In other words, all customers receive the same content stream, and all customers access the same additional content. While this may be sufficient in some instances, the same information is not relevant or interesting to every customer. It is with respect to these and other considerations that the present invention has been made.

BRIEF SUMMARY

Embodiments of the present invention provide for insertion of multiple links or URLs in a content stream and selection of one of the links based on a set of criteria, which may be implemented as business rules. The links may be associated with a particular channel, program, portion of a program, or time stamp association with a video content item based on a program level or channel level per device/customer.

Embodiments of a URL personalization system allow a television service provider to associate additional content with the programming to provide an immersive, interactive television viewing experience. The URL personalization system includes a video content server in communication with a link manager. The video content server streams video content items to customer endpoint devices. The link manager may be in communication with one or more data systems, such as, but not limited to, a URL data system, a rule data system, a video content item data system, and business data systems. A user agent running on the endpoint device receives the content stream and renders the video content item on a display associated with the endpoint device.

In operation, the link manager associates one or more additional content URLs pointing to additional content servers storing additional content with the video content items. The additional content URLs may be stored in the URL data system. Selected additional content URLs may be aggregated into a link object that is associated with a video content item. Criteria, such as target demographic features (e.g., age, gender, residence address), campaign features (e.g., run dates or locations), or restrictions (e.g., adults only) may be associated with individual additional content URLs or with aggregations of additional content URLs (i.e., link objects) and used to create business rules for making personalized selections of additional content URLs for customers.

In various embodiments, the link manager may insert the link object into a content stream being sent by the television service provider to one or more endpoint devices. The link object associates an aggregation of links with an aspect of the content stream. The additional content URLs allow customers to access additional content (e.g., video, audio, data, etc.) associated with the video content item and displays it in various ways according to the capability of the endpoint devices being used. The additional content URLs may also be used for targeted advertising based on the session profile, which may include, without limitation, information about the customer, the capabilities of the endpoint device, and options configured in the user agent of the endpoint device.

For example, a video content item may have multiple URLs associated with one time stamp. When the time stamp is reached, the customer is redirected to the additional content at the personalized URL selected from the aggregated URLs by applying a set of business rules, such as rules based on the endpoint device characteristics. If the customer is watching the program on a tablet, the customer may be redirected to a first URL. If the customer is not interacting with the tablet (e.g., the customer is not looking at the tablet), the customer may be redirected to a second URL. If the customer is watching the program on a television tuned to a channel using a set-top box, the customer may be redirected to a third URL. Other rules covering additional scenarios may be included. Dynamically redirecting the customer to a URL that takes into account the information specific to the customer's situation allows a television service provider or content provider to offer an immersive viewing experience that is valuable to the customer and the owner of the additional content.

The endpoint device may be utilized to access the user agent that provides a user interface for viewing video content items and additional content. The user agent allows the customer to request a video content item from the television service provider, receive the video content item, request additional content associated with the video content item using the link object, retrieve additional content using the personalized URL selected based on the characteristics of the viewing session (e.g., date, time of day, the profile of the customer logged into the user agent, the capabilities of the endpoint device), and display the additional content. The resulting interactive viewing experience may include a blend of requested video content items with additional content and services from the television service provider or third party content owners or providers.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

A uniform resource locator (URL) personalization system and accompanying method are described herein and illustrated in the accompanying figures. The system allows a television service provider to dynamically associate multiple URLs with the content stream being viewed by the customer. The associated URLs point to additional content that may be of interest to different customer demographics. A generic URL linking to the associated URLs may be inserted into the video content item. The system may personalize the generic URL by replacing or modifying the generic URL with a personalized URL based on information specific to the customer viewing the content before streaming the content or when additional content is requested. The customer is redirected to the personalized URL to obtain the additional content determined to be most appropriate for the individual customer. This allows the television service provider to send a single content stream to all customers or large groups of customers while providing individual customers with an enhanced interactive television viewing experience.

Figure 1:
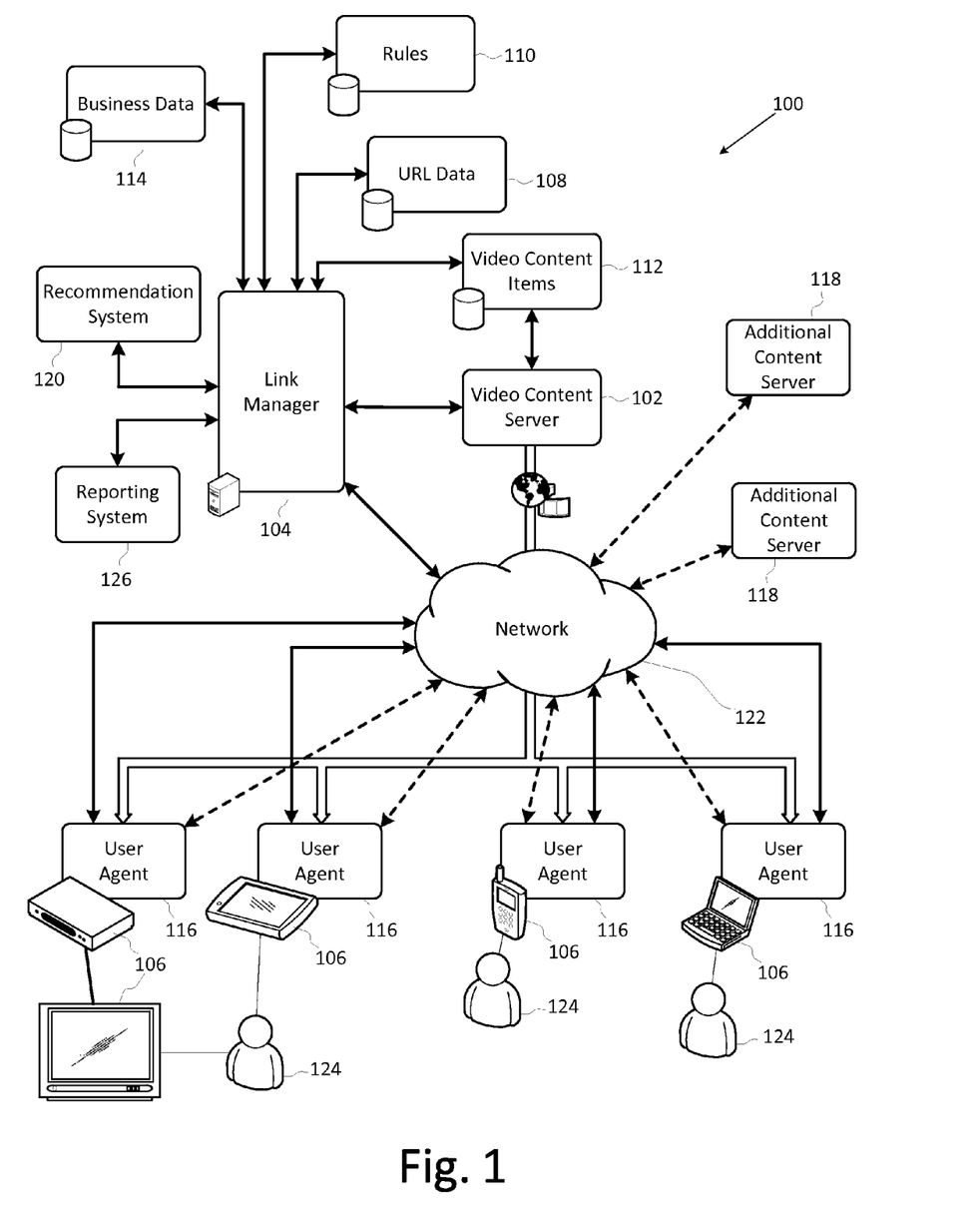
FIG. 1 is a simplified block diagram of one embodiment of a uniform resource locator (URL) personalization system.

FIG. 1 is a simplified block diagram of one embodiment of a uniform resource locator (URL) personalization system. The URL personalization system 100 allows a television service provider to associate additional content with the programming to provide an immersive, interactive television viewing experience. Examples of television service providers include providers of programming, such as, but not limited to, multiple system operators, cable system operators, direct-to-home (DTH) or direct broadcast satellite (DBS) operators (i.e., satellite system operators), terrestrial (i.e., over-the-air) broadcast system operators (e.g., networks and stations), internet protocol television (IPTV) system operators, and Internet television system operators, and internet service providers.

The URL personalization system includes a video content server 102 in communication with a link manager 104. The video content server 102 streams video content items to customer endpoint devices 106. The link manager 104 may be in communication with one or more data systems, such as, but not limited to, a URL data system 108, a rule data system 110, a video content item data system 112, and business data systems 114. A user agent 116 running on the endpoint device 106 receives the content stream and renders the video content item on a display associated with the endpoint device 106.

In operation, the link manager 104 associates one or more additional content URLs pointing to additional content servers 118 storing additional content with the video content items. The additional content URLs may be stored in the URL data system 108. Selected additional content URLs may be aggregated into a link object that is associated with a video content item. As used herein, video content items broadly encompass any video content or audiovisual content including, but not limited to, channels carrying linear or non-linear programming, linear program blocks, individual programs, and non-linear (i.e., on-demand) programs.

The additional content URLs associated with a video content item may be selected by the television service provider or by third parties, such as content providers (i.e., television networks and stations) and advertisers. The television service provider may offer third parties the option to request and/or purchase an association between an additional content URL and a video content item. For example, a television network might choose to associate the URL for the home page of the television network with all channels and programs offered by the television network. The television network might also choose to associate the URL for a web page dedicated to a program and maintained by the television network with the program and the URL for a trailer to a new program in which viewers may be interested. Advertisers may choose to associate URLs for product videos (e.g., commercials) or product web pages with particular channels or programs.

The television service provider may provide URLs to other video content items offered by the television service provider. In various embodiments, a recommendation system 120 in communication with business data systems 114 may automatically select recommended video content items based on information known about the customer, such as past viewing history and customer provided interests and hobbies.

Criteria, such as target demographic features (e.g., age, gender, residence address), campaign features (e.g., run dates or locations), or restrictions (e.g., adults only) may be associated with individual additional content URLs or with aggregations of additional content URLs (i.e., link objects). The criteria may be used to hand craft or automatically generate business rules for making personalized selections of additional content URLs for customers. In a server-side implementation of the URL personalization system 100, the business rules may be stored in the rule data system 110. In a client-side implementation of the URL personalization system, the business rules may be stored in the user agent 116 (e.g., a television service provider guide or viewer application). Alternatively, the business rules or the criteria may be inserted into the metadata associated with the video content item.

Various criteria may be used to associate different additional content URLs with video content items on a per customer or per endpoint device basis. Based on feedback received from the endpoint device, the additional content URLs may be dynamically updated according to the business rules applied to select which of the additional content URLs to be used. In this manner, a customer may be provided with a link to an advertisement, but the advertisement that is provided will be different when the customer accesses the advertisement at 10:00 AM using a tablet than when that customer accesses the advertisement at 9:00 PM from a set-top box and television.

In various embodiments, the link manager 104 may dynamically insert a link object into a content stream being sent by the television service provider to one or more endpoint devices 106 addressable over an internet protocol network 122. Networks suitable for use with the URL personalization system 100 may include, but are not limited to, one or more of a television service provider content delivery network, the Internet, a wide area network, and a local area network. Examples of suitable endpoint devices 106 include, but are not limited to, digital set-top boxes, personal computers, tablet computing devices, smart phones, smart televisions, digital media players, and game consoles.

The link object associates an aggregation of links with an aspect of the content stream, including, without limitation, a particular video content item (i.e., a program) or the channel carrying the program. The link object may be persistent for the duration of the content stream or limited to portions of the content stream (e.g., specific scenes within the content stream). The aggregated URLs are a collection of URLs linking to additional content located on a content server. The additional content URLs allow customers to access additional content (e.g., video, audio, data, etc.) associated with the video content item and may display the additional content in various ways according to the capabilities of the endpoint devices being used. The additional content URLs may also be used for targeted advertising based on the session profile, which may include, without limitation, information about the customer, the capabilities of the endpoint device, and options configured in the user agent of the endpoint device.

For example, a video content item may have multiple URLs associated with one time stamp. When the time stamp is reached, the customer is redirected to the additional content at the personalized URL selected from the aggregated URLs by applying a set of business rules, such as rules based on the endpoint device characteristics. If the customer is watching the program on a tablet, the customer may be redirected to a first URL. If the customer is not interacting with the tablet (e.g., the customer is not looking at the tablet), the customer may be redirected to a second URL. If the customer is watching the program on a television tuned to a channel using a set-top box, the customer may be redirected to a third URL. Other rules covering additional scenarios may be included. Dynamically redirecting the customer to a URL that takes into account the information specific to the customer's situation allows a television service provider or content provider to offer an immersive viewing experience that is valuable to the customer and the owner of the additional content.

Video content items may be live or pre-recorded programs streamed as linear programming (e.g., the program lineup on a particular channel). Video content items also encompass non-linear programming from a video on-demand system or a cloud-based digital video recorder. It is worth noting that time-shifting the viewing of a video content item originally streamed by the television service provider may not prevent operation of the URL personalization system. For example, the link object may be stored with a video content item streamed by the television service provider and recorded by a customer using a local digital video recorder or other time-shifting device. When the locally stored copy is played back (i.e., streamed from the local digital video recorder to the endpoint device), the link object associated with the video content item may be processed and the aggregated URLs may be personalized.

The endpoint device 106 may be utilized to access the user agent 116 that provides a user interface for viewing video content items and additional content. The user agent 116 allows the customer 124 to request a video content item from the television service provider, receive the video content item, request additional content associated with the video content item using the link object, retrieve additional content using the personalized URL selected based on the characteristics of the viewing session (e.g., date, time of day, the profile of the customer logged into the user agent, the capabilities of the endpoint device), and display the additional content. The resulting interactive viewing experience may include a blend of requested video content items with additional content and services from the television service provider or third party content owners or providers. According to embodiments, the user agent 116 or other application running on the endpoint device 106 may communicate customer profile data and display device data to the link manager 104.

A reporting module 126 may collect information, such as, but not limited to, the customer identifier used when accessing the link object, the links available to the customer, and the link that is accessed. The information collected by the reporting module 126 may be reported to the television service provider or the content owner. Such information allows the television service provider or the content source to ascertain the utilization of the available links. The link manager 104 may analyze the reported information and update the available aggregated URLs based on the analysis results. Analysis of the reported information and updates to the available aggregated URLs may occur in real time.

The various components of the URL personalization system 100, including, without limitation, the video content server 102, the link manager 104, the recommendation system 120, the reporting module 126, and the various data systems, may be implemented using one or more computing devices (e.g., application servers or data servers) executing software providing the functionality described herein.

Figure 2:
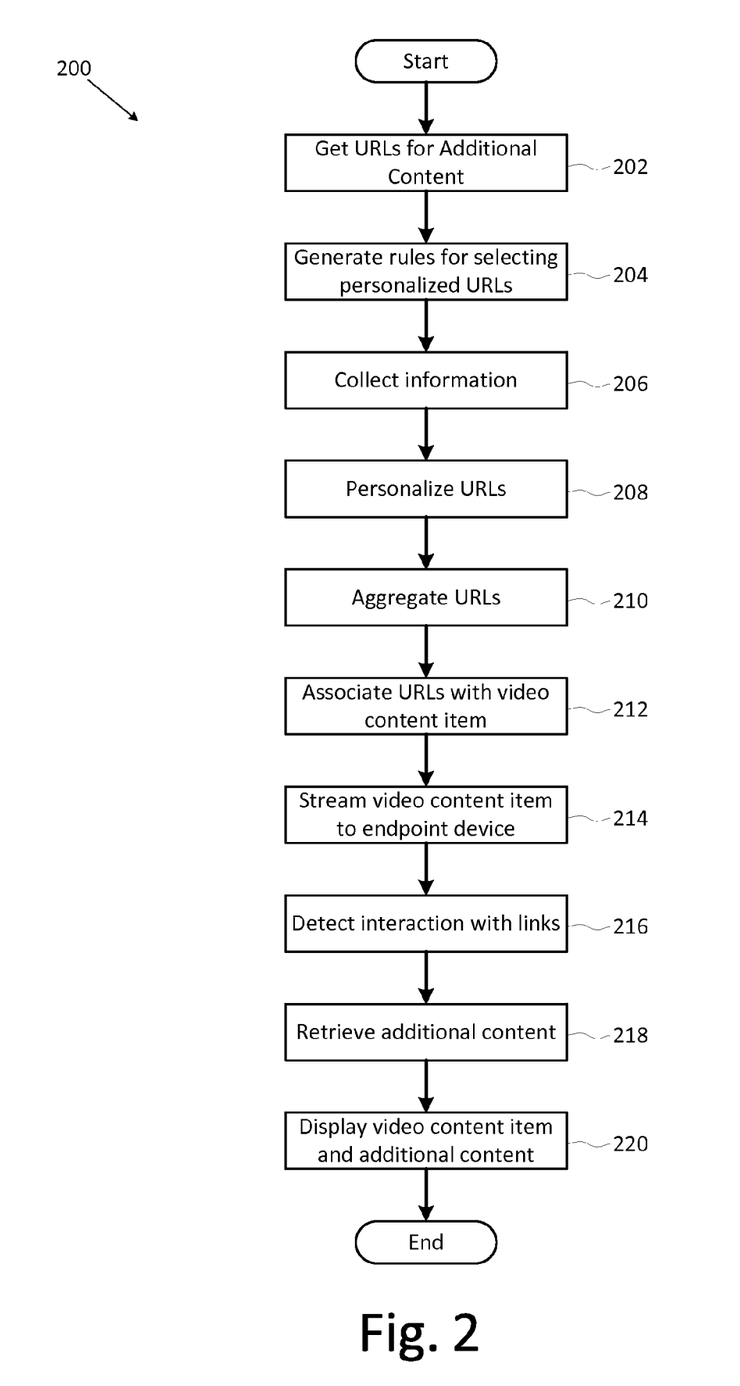
FIG. 2 is a high level flow chart of a method for dynamic URL personalization performed by the system of FIG. 1.

FIG. 2 is a high level flowchart of the method for personalizing URLs associated with a content stream. The method 200 begins with a URL definition operation 202 where one or more URLs pointing to additional content that may be of general interest to all customers or of particular interest to certain customers are obtained. Examples of the types of additional content that may be referenced by a URL include, without limitation, supplemental information related to a program, advertising, and emergency alerts. The additional content may be provided by the content provider, an advertiser, or other entity. Additional content may be in the form of, but not limited to, web pages or content streams.

A rule building operation 204 generates a business rule set that may be used to select, update, edit, or replace one or more of the aggregated URLs based on a session profile that may include various information about the customer, the endpoint device, the user agent configuration, and viewing characteristics. The business rule set incorporates one or more evaluation criteria that determine which URL or URLs are applicable to a particular viewing situation. Stated differently, each URL may have one or more associated evaluation criteria that determine whether URL is applicable in a particular viewing situation. While described as business rules, it should be appreciated that a decision tree or other evaluation mechanism may be used to personalize the URLs from the aggregated URLs to the customer. Embodiments may use generalized business rule sets that are broadly applicable to a number of different URL sets, customized business rule sets specifically applicable only to particular URL sets, or a combination thereof.

In various embodiments, a default URL may be associated with each channel or video content item and used in situations such as when no other URLs are associated with a video content item, none of the other associated URLs apply, or no personalization rules are supplied. For example, the default URL may redirect customers to the home page of the website for the television service provider streaming the video content item to the customer, the television network that created the video content item, or the television channel including the video content item in its programming. Embodiments may aggregate the default URL into the URL set or use as the default URL the generic link. Alternatively, embodiments may use a default rule to replace a generic link with the default URL.

An information collection operation 206 collects various information, which may include, without limitation, information about the capabilities of the endpoint device being used to view the video content item, the customer viewing the video content item, and the options configured in the user agent running on the endpoint device. For example, the user agent may communicate customer profile data and endpoint device data to the link manager when the customer changes requests a video content item. Basic information such as the endpoint device IP address, the customer identifier, date, and time may be transmitted by the user agent. In some embodiments, the basic information may be used to obtain further information. For example, business data systems maintained by the television service provider may store customer profiles containing information voluntarily provided by customers or collected in the ordinary course of business, such as, without limitation, billing data (e.g., residence address), demographic data (e.g., age and gender), preferences and interests (e.g., hobbies, preferred program genres, program ratings, etc.), historical activity information (e.g., on-demand content viewed/purchased), which may be retrieved using the customer identifier. Some information such as the endpoint device IP address may be dynamically assigned and may be used to identify the current general location (e.g., a region or city) of the customer. Other information, such as endpoint device capabilities and user agent configuration, is not typically stored by television service provider business data systems.

A URL personalization operation 208 applies evaluation criteria to the information in the session profile to select personalized URLs to associate with the video content item. The evaluation criteria may be implemented in a variety of ways including, but not limited to, business rules, comparisons, or decision trees. When the aggregated URLs are carried by the link object, the URL personalization operation 208 may select one of the URLs from the aggregated URLs as the personalized URL based on the results of the business rule application. When the link object is a generic URL that points to a location where the associated aggregated URLs are stored, the URL personalization operation 208 may replace the generic URL with one of the aggregated URLs based on the results of the business rule application. The URL personalization operation 208 may also personalize URLs by modifying, adding, or deleting URLs associated with the link object. Modification may involve changes such as, but not limited to, rewriting or adding parameters to a generic URL or some or all of the aggregated URLs.

The evaluation criteria may be based on information including, but not limited to, at least one of a customer identifier associated with the customer viewing the video content item, a customer profile associated with the customer identifier, a video content item profile associated with the video content item being viewed, additional content profiles for the additional content associated with the video content item being viewed, current session data associated with viewing the video content item, an endpoint device profile associated with the endpoint device used to view the video content item, options configured in the user agent used to view the video content item, and interaction indicators.

Examples of customer profile data include, without limitation, addresses, age, gender, interests, hobbies, preferences, languages, billing history, and viewing history associated with the customer.

Examples of video content item profile data include, without limitation, a genre, live/pre-recorded status, and linear/non-linear (i.e., on-demand) status associated with the video content item being viewed by the customer.

Examples of additional content profile data include, without limitation, a content type, priority, weights, and restrictions on and/or eligibilities for time, date, location, age, parental controls, languages, and other characteristics. The restriction data may be used to define conditions such as when, where, or to whom the additional content (i.e., the associated URL) is or is not available, a lifespan for the additional content, and the like.

Examples of current session data include, without limitation, a location where the video content item is being viewed, a time of day when the video content item is being viewed, and a date when the video content item is being viewed.

Examples of endpoint device profile data include, without limitation, a device identifier, internet protocol (IP) address, media access control (MAC) address, and display capabilities of the endpoint device used to view the video content item and access the additional content.

Examples of user agent option data include, without limitation, closed captioning settings, secondary audio programming settings; and parental controls associated with customer identifier.

Examples of interaction indicators include, without limitation, detection of eyes looking at the endpoint device and inputs using the endpoint device.

The following scenarios are representative of URL personalization that may be implemented through the application of business rules as part of the URL personalization operation 208. These scenarios are not intended to limit the diverse range of URL personalization available in any way.

For example, a business rule may be based on the secondary audio program (SAP) setting. Anytime SAP is turned on, the system attempts to utilize the URL associated with the language indicated by the SAP setting.

Another business rule may personalize URLs based on one or more of the characteristics of the session profile. For example, the parental control and the secondary audio program (SAP) settings may be evaluated together allowing URLs to be personalized based on both the age and language of the customer.

The URLs may be prioritized to allow selection of the most appropriate URL when multiple criteria are satisfied. For example, one URL might redirect customers in a particular viewing location to an advertisement for a local restaurant and another URL might redirect customers viewing the content after midnight to an advertisement to a sleep aid. The sleep aid advertisement URL may be given greater priority such that if both the viewing location and viewing time criteria are satisfied, the sleep aid advertisement URL is selected as the most appropriate personalized URL. Similarly, the evaluation criteria may be used to score the characteristics and select the most appropriate URL based on the score. The contribution to the score for each characteristic may be weighted to emphasize certain characteristics.

The URLs may also be dynamically updated based on the output of the recommendation system or the reporting system. For example, when the customer accesses a car advertisement for a car featured in a video content item, the URLs may be updated to cater to the customer's apparent interest in the car to include additional content URLs for car reviews, auto loan financing options, and/or local car dealerships.

A URL aggregation operation 210 may group one or more URLs to be associated with a particular video content item into a URL set. The URL aggregation operation 206 210 may aggregate URLs provided by different entities. The set of URLs may include at least one URL of general applicability, such as the home page of the website for the television service provider or television channel delivering the video content item. The URL set may also include one or more URLs of targeted applicability, for example, URLs pointing to additional content related to a particular video content item or targeted at particular demographic groups.

The URL set may be stored in a link object or stored in a URL repository (e.g., a database) referenced using a generic URL that points to the URL set. In some instances, the link object may contain multiple URLs associated with the video content item from which a personalized URL may be selected or which may be modified to create personalized URLs. In some instances, the link object may hold a single generic URL that links to a location where the URLs associated with the video content item are stored.

A link object association operation 212 associates the link object with a video content item that may be streamed to customer endpoint devices. The link object may be associated with the video content item via a variety of mechanisms. For example, the link object may be inserted in the metadata or may be sent in a separate data stream synchronized with the video content item. In some embodiments, the link object may be a container holding the aggregated URLs. In other embodiments, the link object may be generic link pointing to the location where the additional content URLs are stored (e.g., the URL data system 108).

A video content item delivery operation 214 delivers the content stream carrying the video content item with the associated link object to customer endpoint devices.

A link interaction detection operation 216 detects when the link object is activated. As used herein, activation of a link object encompasses any activity that requires personalization of the aggregated URLs associated with the link object including, but not limited to, selecting, modifying, or filtering the aggregated URLs or user interface controls displayed and invoking the link object to request additional content. Activation of the link object may occur automatically (e.g., upon occurrence of a selected condition) or manually (e.g., interaction with user interface control).

An additional content retrieval operation 218 obtains the additional content from the content server located at address specified by the additional content URL.

An interactive content display operation 220 displays the video content item and the additional content on the customer's endpoint device(s). The personalized URLs may also be used to present the video content and additional content in a variety of display configurations based on factors such as the display capabilities of the endpoint device(s), the type of addition content, and the importance/priority/preference given to the additional content. Numerous presentation scenarios may be personalized through rules based on endpoint device capabilities and content characteristics. The following scenarios are representative of where the presentation of video content items and additional content may be enhanced through the use of the URL personalization system.

For example, sensory-competitive additional content, which includes audio and/or video content (e.g., a commercial, video game or movie trailer, audio or video commentary, or song), may, at least temporarily, replace the video content item or result in the video content item being paused or muted. Integral additional content, such as karaoke style lyrics for a music video, closed captioning, or subtitles may be presented as an overlay on the video content item.

Dissimilar additional content, such as an image, webpage, other static visual content, and other content that does not include competing audio components (e.g., a video window of an interpreter translating the spoken audio of the video content item into sign language) may be presented simultaneously in a split screen or windowed arrangement, depending upon the screen size and/or screen resolution of the endpoint device. In some embodiments, the video content item may be windowed, but remain dominant, with the additional content displayed alongside the video content item window. Conversely, if greater emphasis is placed on the additional content (e.g., emergency preparedness information), the video content item may be subordinated to the additional content and displayed in a scaled window embedded in the additional content.

If a companion device is available, the additional content and the video content item may be redirected to separate displays in cases where the use of a secondary display enhances the interactive experience. By way of example, personalizing the URL to simultaneously display an additional content website and the video content item on separate endpoint devices typically provides an immersive and enhancing viewing experience. Conversely, simultaneously presenting integral content on separate endpoint devices would not be an enhancement, and simultaneously presenting sensory-competitive content on separate endpoint devices would detract from the interactive experience.

As previously mentioned, URL personalization may occur prior to making a request for additional content. One example of URL personalization prior to making a request for additional content occurs when determining whether the aggregated URLs should be available to the current customer. In other words, Links associated with the video content item that are not In the case of a link object configured to display one or more user interface controls allowing the customer to choose whether to view the additional content, it may be desirable to personalize the URLs before displaying the user interface controls. By not offering additional content that is not suitable or interesting to customers, the interactive television viewing experience may be enhanced.

Embodiments may integrate additional content selection and display configuration personalization rules or additional content selection and display configuration personalization rules may be crafted to be applied separately. In other words, URL personalization to select the URL for the additional content may be performed and then the URL further personalized to configure the presentation of the additional content.

The link object may be automatically or manually activated to cause the additional content to be displayed to the customer. For example, the link object may be automatically activated at a specific point in time (i.e., a time stamp associated with the video content item) to display additional content in the form of an advertisement video to the customer (i.e., a commercial break). However, instead of displaying the same commercial to all customers, a personalized advertisement URL may be selected from the aggregated URLs associated with the link object. For example, when the link object is activated in a television program that appeals to both children and adults, the business rules may use the age category associated with the active customer profile to personalize the URL that provides the targeted advertising content. The personalized URL may cause a coffee advertisement to be displayed if the active customer profile belongs to an adult, a soft drink advertisement to be displayed if the active customer profile belongs to a teenager, and a juice box advertisement to be displayed if the active customer profile belongs to a young child.

A manually activated link object may be associated with a button other control that initiates URL personalization and access the additional content. For example, in the case of a video content item that has a dedicated website provided as additional content, a button that activates the link object may be displayed while the video content item is being viewed. When the button is activated, information about the endpoint device being used to request the additional content may be used to personalize the URL and configure how the website is displayed. On a large screen/high resolution endpoint device (e.g., a television or personal computer), the personalized URL may split the screen and display the video content item side-by-side with the website dedicated to the video content item. On a small screen/low resolution endpoint device (e.g., a smartphone), the personalized URL may pause playback of the video content item and use the full display of the endpoint device to show the website. When the customer closes the website, the playback of the video content item may resume automatically using the full display of the endpoint device. If the customer is using a companion endpoint device (e.g., a tablet computing device) with a primary endpoint device (e.g., a set-top box and attached television), the personalized URL may redirect the additional content to the companion device while the video content item continues to be shown on the primary endpoint device.

Figure 3:
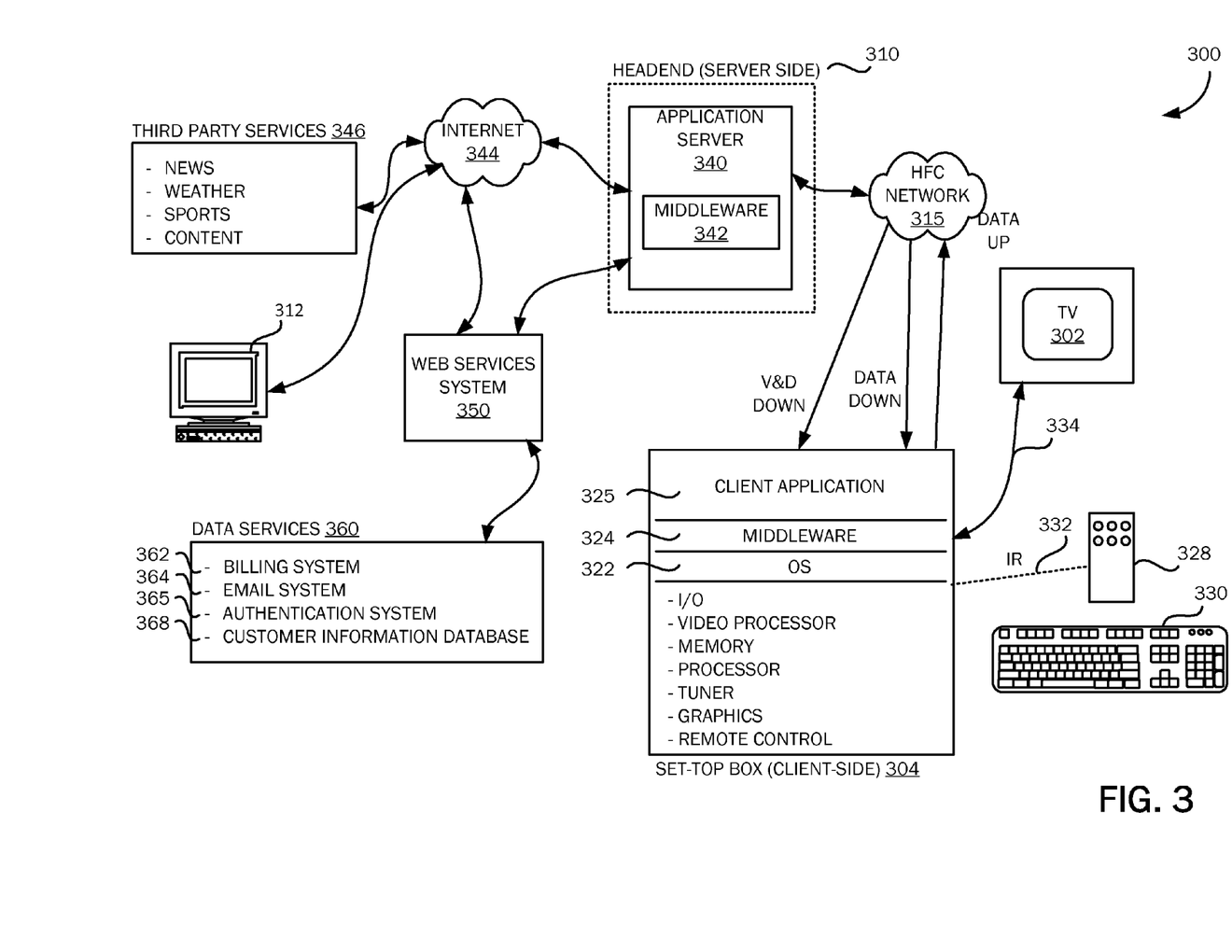
FIG. 3 is a simplified block diagram illustrating a cable television services system architecture providing an operating environment according to an embodiment of the system described herein.

FIG. 3 is a simplified block diagram illustrating one embodiment of a cable television services system (hereafter referred to as "CATV") suitable for use with the present system. As should be appreciated, a CATV services system 300 is but one of various types of systems that may be utilized for providing an operating environment for providing the functionality described herein. Digital and analog video programming, information content, and interactive television services are provided via a hybrid fiber-coax (HFC) network 315 to a television set 302 for consumption by a cable television/services system customer. As is known to those skilled in the art, HFC networks 315 combine both optical fiber and coaxial cable lines. Typically, optical fiber runs from the cable headend 310 to neighborhoods of subscribers. Coaxial cable runs from the optical fiber feeders to each customer or subscriber. The functionality of the HFC network 315 allows for efficient bidirectional data flow between the client-side set-top box 304 and the server-side application server 340 of the embodiment.

The CATV system 300 is in the form of a distributed client-server computing system for providing video and data flow across the HFC network 315 between server-side services providers (e.g., cable television/services providers) via a server-side headend 310 and a client-side customer via a client-side set-top box 304 functionally connected to a customer receiving device, such as the television set 302. As is understood by those skilled in the art, modern CATV systems 300 may provide a variety of services across the HFC network 315 including traditional digital and analog video programming, telephone services, high speed Internet access, video-on-demand, and information services.

On the client side of the CATV system 300, digital and analog video programming and digital and analog data are provided to the customer television set 302 via the set-top box 304. Interactive television services that allow a customer to input data to the CATV system 300 likewise are provided by the set-top box 304. In the illustrated embodiment, the set-top box 304 is a multipurpose computing device having a computer processor, memory, and an input/output mechanism. The input/output mechanism receives input from server-side processes via the HFC network 315 and from customers via input devices such as the remote control device 328, keyboard 330, or other computing device 312, such as a smart phone, a personal computer (e.g., a laptop or desktop), a smart television, a set-top box, a tablet/slate computer, etc. The remote control device 328 and the keyboard 330 may communicate with the television 302 or the set-top box 304 via a suitable communication transport such as the infrared connection 332. The remote control device 328 may include a biometric input module. The set-top box 304 also includes a video processor for processing and providing digital and analog video signaling to the television set 302 via a cable communication transport 334. A multi-channel tuner is provided for processing video and data to and from the set-top box 304 and the server-side headend system 310, described below.

The set-top box 304 also includes an operating system 322 for directing the functions of the set-top box 304 in conjunction with a variety of client applications 325. For example, if a client application 325 requires a news flash from a third-party news source to be displayed on the television set 302, the operating system 322 may cause the graphics functionality and video processor of the set-top box 304, for example, to output the news flash to the television set 302 at the direction of the client application 325 responsible for displaying news items.

Because a variety of different operating systems 322 may be utilized by a variety of different brands and types of set-top boxes, a middleware layer 324 may be provided to allow a given software application to be executed by a variety of different operating systems. According to an embodiment, the middleware layer 324 may include a set of application programming interfaces (APIs) that are exposed to client applications 325 and operating systems 322 that allow the client applications to communicate with the operating systems through common data calls understood via the API set. As described below, a corresponding middleware layer is included on the server side of the CATV system 300 for facilitating communication between the server-side application server 340 and the client-side set-top box 304. The middleware layer 342 of the server-side application server 340 and the middleware layer 324 of the client-side set-top box 304 may format data passed between the client side and server side according to the Extensible Markup Language (XML).

According to one embodiment, the set-top box 304 passes digital and analog video and data signaling to the television set 302 via a one-way communication transport 334. According to other embodiments, two-way communication transports may be utilized, for example, via high definition multimedia (HDMI) ports. The set-top box 304 may receive video and data from the server side of the CATV system 300 via the HFC network 315 through a video/data downlink and data via a data downlink. The set-top box 304 may transmit data from the client side of the CATV system 300 to the server side of the CATV system 300 via the HFC network 315 via one data uplink. The video/data downlink is an in-band downlink that allows for digital and analog video and data signaling from the server side of the CATV system 300 through the HFC network 315 to the set-top box 304 for use by the set-top box 304 and for distribution to the television set 302. The in-band signaling space operates in a specified frequency range that is generally divided into channels. Each channel may carry one or more signals, for example, a single analog signal or multiple digital signals.

The data downlink and the data uplink between the HFC network 315 and the set-top box 304 comprise out-of-band data links. The out-of-band frequency range is generally lower than the frequency range used for in-band signaling. Data flow between the client-side set-top box 304 and the server-side application server 340 is typically passed through the out-of-band data links. Alternatively, an in-band data carousel may be positioned in an in-band channel into which a data feed may be processed from the server-side application server 340 through the HFC network 315 to the client-side set-top box 304. Operation of data transport between components of the CATV system 300 is well known to those skilled in the art.

The headend 310 of the CATV system 300 is positioned on the server side of the CATV system and includes hardware and software systems responsible for originating and managing content for distributing through the HFC network 315 to client-side set-top boxes 304 for presentation to customers via television set 302. As described above, a number of services may be provided by the CATV system 300, including digital and analog video programming, interactive television services, telephone services, video-on-demand services, targeted advertising, and provision of information content.

The application server 340 is a computing system operative to assemble and manage data sent to and received from the client-side set-top box 304 via the HFC network 315. As described above with reference to the set-top box 304, the application server 340 includes a middleware layer 342 for processing and preparing data from the headend of the CATV system 300 for receipt and use by the client-side set-top box 304. For example, the application server 340 via the middleware layer 342 may obtain data, such as content metadata, from third-party services 346 via the Internet 344 for transmitting to a customer through the HFC network 315 and the set-top box 304. When the application server 340 receives the downloaded content metadata, the middleware layer 342 may be utilized to format the content metadata for receipt and use by the set-top box 304. Therefore, content metadata may be sent and categorized based on the availability to the customer's program guide data.

According to one embodiment, data obtained and managed by the middleware layer 342 of the application server 340 is formatted according to the Extensible Markup Language and is passed to the set-top box 304 through the HFC network 315 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 344 for provision to customers via the HFC network 315 and the set-top box 304. According to embodiments, client application 325 may include the user agent described herein.

According to embodiments, the application server 340 obtains customer support services data, including billing data, information on customer work order status, answers to frequently asked questions, services provider contact information, and the like from data services for provision to the customer via an interactive television session. In the illustrated embodiment, the services provider data services include a number of services operated by the services provider of the CATV system 300 which may include data on a given customer.

A billing system 362 may include information such as a customer's name, street address, business identification number, Social Security number, credit history, and information regarding services and products subscribed to by the customer. According to embodiments, the billing system 362 may also include billing data for services and products subscribed to by the customer for bill processing, billing presentment, and payment receipt.

A customer information database 368 may include general information about customers such as place of employment, business address, business telephone number, and demographic information such as age, gender, educational level, and the like. The customer information database 368 may also include information on pending work orders for services or products ordered by the customer. The customer information database 368 may also include general customer information such as answers to frequently asked customer questions and contact information for various service provider offices/departments. As should be understood, this information may be stored in a variety of disparate databases operated by the cable services provider.

A web services system 350 serves as a collection point for data requested from the various data services systems. According to embodiments, when the application server 340 requires customer services data from one or more of the data services, the application server 340 passes a data query to the web services system 350. The web services system formulates a data query to each of the available data services systems for obtaining any required data for a requesting customer as identified by a set-top box identification associated with the customer. The web services system 350 serves as an abstraction layer between the various data services systems and the application server 340. That is, the application server 340 is not required to communicate with the disparate data services systems, nor is the application server 340 required to understand the data structures or data types utilized by the disparate data services systems. The web services system 350 is operative to communicate with each of the disparate data services systems for obtaining necessary customer data. The customer data obtained by the web services system is assembled and is returned to the application server 340 for ultimate processing via the middleware layer 342, as described above.

An authentication system 365 may include information such as secure user names, subscriber profiles, subscriber IDs, and passwords utilized by customers for access to network services. As should be understood by those skilled in the art, the disparate systems 362, 364, 365, 368 may be integrated or provided in any combination of separate systems, of which the illustrated embodiment is only one example.

Figure 4:
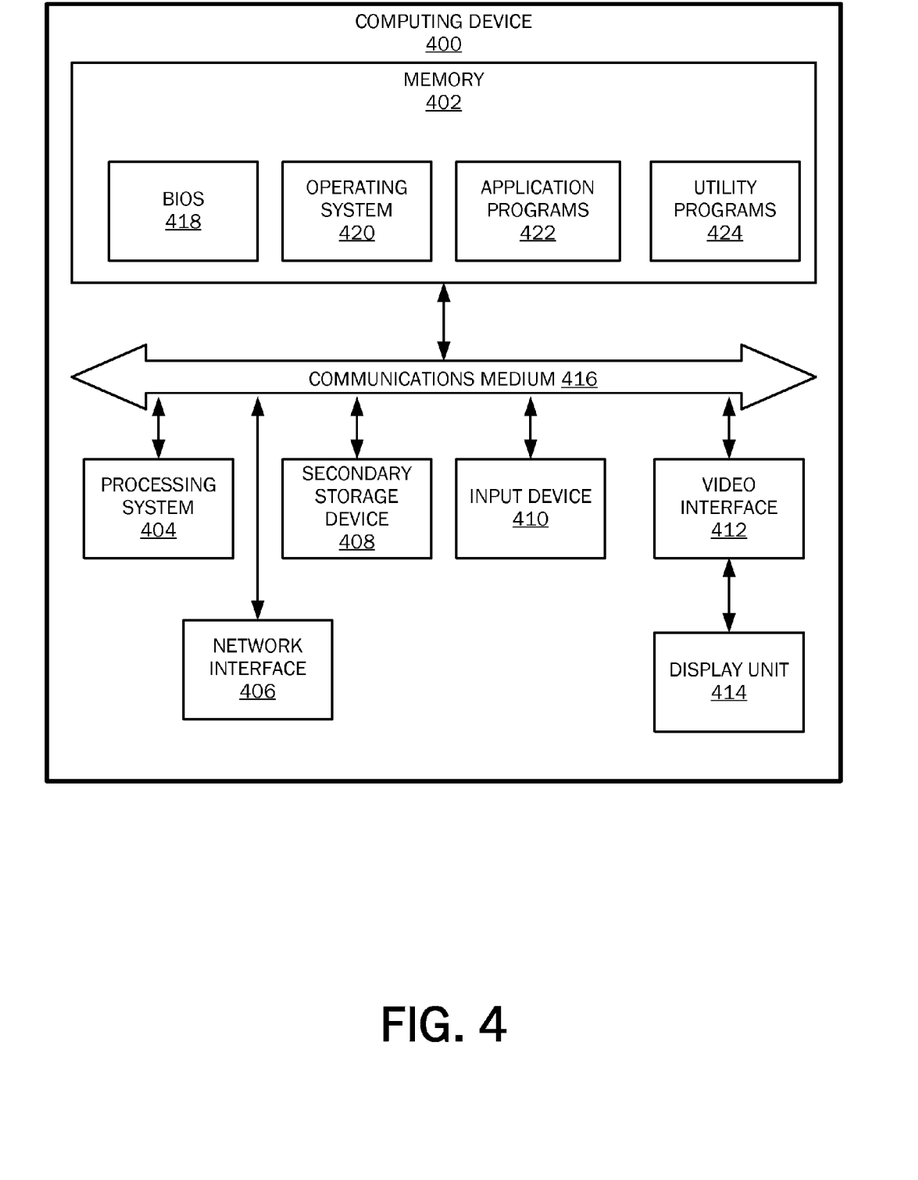
FIG. 4 is a block diagram illustrating example physical components of a computing device with which embodiments of the system described herein may be practiced.

FIG. 4 is a simplified block diagram illustrating example physical components of a computing device 400 with which embodiments of the system 100 may be practiced. In some embodiments, one or more of the components of system 100 may be implemented using one or more computing devices like the computing device 400. It should be appreciated that in other embodiments, components of system 100 may be implemented using computing devices having hardware components other than those illustrated in the illustrated embodiment.

Computing devices may be implemented in different ways in different embodiments. For instance, in the illustrated embodiment, the computing device 400 includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

Memory 402 and secondary storage device 408 may store computer-readable information, such as, but not limited to, computer-executable instructions (e.g., programs), data structures, and/or data. The processing system 404 may perform an I/O operation to retrieve the computer-readable information from the secondary storage device 408. According to one embodiment, any of the applications of the system 100 may be may be stored locally on computing device 400. Thus, memory 402 and/or secondary storage device 408 may store the computer-executable instructions that, when executed by processor 404, provide the functionality described herein via the system 100.

In various embodiments, memory 402 and secondary storage device 408 may be implemented as various types of computer-readable storage media. Computer-readable storage media broadly encompasses removable and non-removable devices, media, and other articles of manufacture, which may be implemented in various methods or technologies, providing for volatile or nonvolatile storage and retrieval of computer-readable information. As used herein, computer-readable media includes computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), magnetic disks, magnetic tape drives, CD-ROM discs, DVD-ROM discs, and Blu-Ray discs.

The computing device 400 may be enabled to send data to and receive data from a communication network via a network interface card 406. In different embodiments, the network interface card 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 410 enables the computing device 400 to receive input from a user. Example types of input devices include, but are not limited to, keyboards, mice, trackballs, stylus input devices, keypads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the illustrated embodiment, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an AcceleratedGraphics Port (AGP) bus, an InfiniBand interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 402 stores various types of data and/or software instructions. For instance, in the illustrated embodiment, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

Figure 5A:
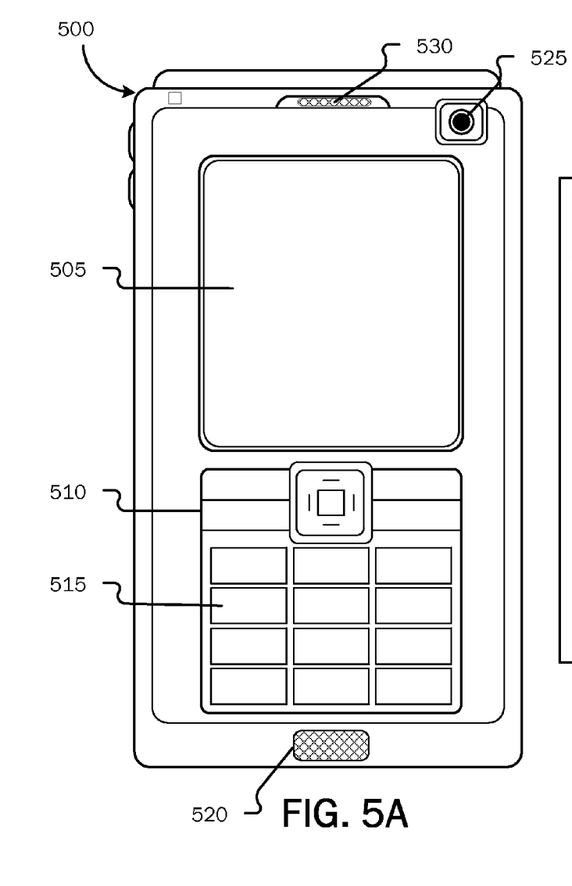
FIGS. 5A-B illustrate a suitable mobile computing environment with which embodiments of the system described herein may be practiced.
Figure 5B:
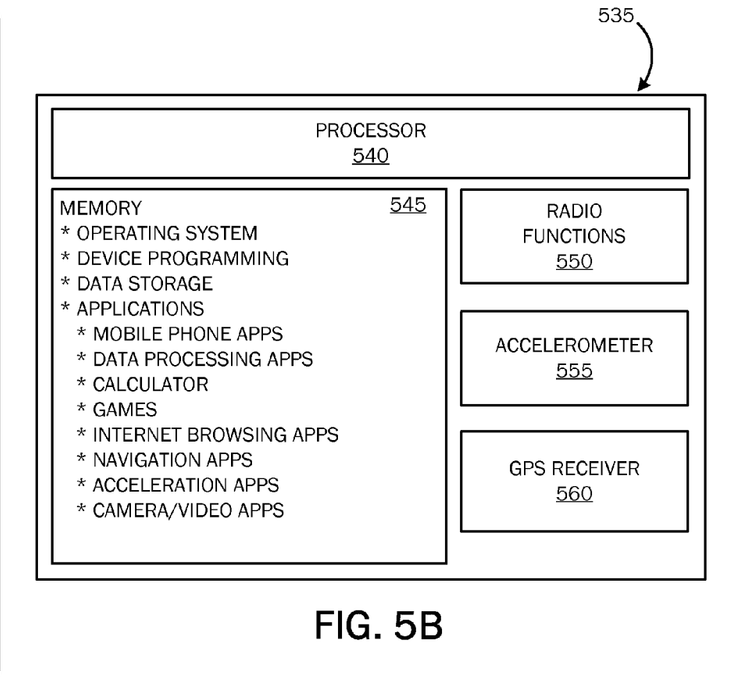

FIGS. 5A and 5B illustrate a suitable mobile computing environment, for example, a mobile computing device, a smart phone, a laptop computer, a tablet personal computer, and the like, with which embodiments may be practiced. The mobile computing device 500 is illustrative of any suitable device operative to send, receive, and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the device 500 may be performed via a variety of suitable means, such as, touch screen input via the display screen 505, keyboard or keypad input via a data entry area 510, key input via one or more selectable buttons or controls 515, voice input via a microphone 520 disposed on the device 500, photographic input via a camera 525 functionality associated with the mobile computing device, or any other suitable input means. Data may be output via the device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory 545 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application may be stored locally on mobile computing device 500.

Mobile computing device 500 may contain an accelerometer 555 for detecting acceleration, and can be used to sense orientation, vibration, and/or shock. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the device 500 to communicate with other communication devices and systems via a wireless network. Radio functions 550 may be utilized to communicate with a wireless or a WI-FI positioning system to determine the location of a device 500.

Although described herein in combination with mobile computing device 500, in alternative embodiments the invention may be used in combination with any number of computer systems, such as in desktop environments, laptop or notebook computer systems, multiprocessor systems, microprocessor-based or programmable customer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:
1. A URL personalization system comprising:
   a video content item having associated metadata transmitted to a plurality of customers;
   a plurality of additional content URLs associated with the video content item;
   each customer having an endpoint device having a display, each endpoint device operable to:
      receive the video content item and the additional content URLs; and
      present the video content item to each customer via the display;
   a business rule memory unit operable to store a set of business rules for selecting a URL personalized for each customer from the additional content URLs associated with the video content item;
   an application server operable to:
      insert a generic URL pointing to a URL data system operable to store the additional content URLs in the metadata of the video content item, stream the video content item and the associated metadata to the endpoint device, and receive a request to access the additional content URLs from the endpoint device from a customer made using the generic URL;
   a URL personalization engine including the URL data system in communication with at least one of the application server and the endpoint device, the URL personalization engine operable to:
      obtain information about at least one of the customer viewing the video content item and the endpoint device of the customer used to view the video content item; and
      via the endpoint device of the customer, make a personalized selection of one of the additional content URLs associated with the video content item by evaluating the received information using the business rules;
   wherein the application server is further operable to replace the generic URL with the personalized selection of the one additional content URL, based on the information obtained from the at least one of the customer viewing the video content item and the endpoint device of the customer, in order to allow personalization of the additional content to be obtained from the content server; and
   wherein the endpoint device is further operable to:
      retrieve the additional content from a content server using the selected one additional content URL; and
      present the received additional content to the customer via the display.

2. The URL personalization system of claim 1 wherein the application server is further operable to insert the URLs into a link object associated with the video content item.

3. The URL personalization system of claim 1 wherein the application server is further operable to insert the additional content URLs into the metadata of the video content item.

4. The URL personalization system of claim 3 wherein the URL personalization engine is executed by the endpoint device.

5. The URL personalization system of claim 1 wherein the endpoint device sends information about at least one of the customer viewing the video content item and the endpoint device used to view the video content item to the application server when additional content is requested using the generic URL.

6. The URL personalization system of claim 1 further comprising a reporting module operable to provide a report indicating the additional content URLs associated with the video content item and the selected additional content URL.

7. The URL personalization system of claim 6 wherein the additional content URLs are dynamically updated to link to other content servers based on the report provided by the reporting module.

8. A computer readable storage device containing computer executable instructions which, when executed by a computer, perform a method of utilizing multiple uniform resource locators (URLs) to provide a customer with an enhanced interactive television viewing experience when a video content item, the method comprising:

- associating a plurality of different additional content URLs with a video content item;
- inserting a generic URL pointing to the additional content URLs;
- streaming the video content item to an endpoint device usable by the customer to view the video content item;
- accessing the additional content URLs from the endpoint device using the generic URL;
- collecting information about at least one of the customer and the display capabilities of the endpoint device;
- making a personalized selection of one of the additional content URLs based on the collected information;
- replace the generic URL with the selected URL in order to allow personalization of the additional content presented to the customer; and
- displaying both the video content item and the additional content located at the selected additional content URL on the endpoint device to provide a personalized interactive viewing experience for the customer.

* * * * *